US012234781B1

(12) United States Patent
Wolk et al.

(10) Patent No.: US 12,234,781 B1
(45) Date of Patent: Feb. 25, 2025

(54) ENGINE BRAKING STRATEGY USING CYLINDER FLOW-THROUGH PATH FOR OPTIMIZING BRAKING POWER

(71) Applicant: Caterpillar Inc., Peoria, IL (US)

(72) Inventors: Matthew Wolk, Peoria, IL (US); Michael D. Roley, Washington, IL (US); John R. McDonald, Peoria, IL (US); Ry C. Colwell, Dunlap, IL (US); Quinton Burcar, Chillicothe, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 18/633,622

(22) Filed: Apr. 12, 2024

(51) Int. Cl.
*F02D 13/04* (2006.01)
*F02D 13/02* (2006.01)
*F02D 41/00* (2006.01)

(52) U.S. Cl.
CPC ......... *F02D 13/04* (2013.01); *F02D 13/0207* (2013.01); *F02D 41/0007* (2013.01)

(58) Field of Classification Search
CPC ..... F01L 13/0036; F01L 13/06; F01L 13/065; F01L 1/08; F01L 1/181; F01L 1/20; F01L 1/26; F01L 9/14; F01L 2013/101; F01L 2013/103; F01L 2305/00; F01L 2820/01; F01L 2820/033; F01L 2800/00; F01L 2800/08; F02D 13/04; F02D 13/06; F02D 13/0207; F02D 13/0276; F02D 13/028; F02D 41/0005; F02D 41/0007; F02D 2200/04; F02D 2041/0017; Y02T 10/12
See application file for complete search history.

(56) References Cited

U.S. PATENT DOCUMENTS

| | | | | |
|---|---|---|---|---|
| 5,586,531 | A * | 12/1996 | Vittorio | F02D 13/04 123/320 |
| 5,626,116 | A * | 5/1997 | Reedy | F01L 13/065 123/321 |
| 6,000,374 | A * | 12/1999 | Cosma | F01L 1/267 123/321 |
| 6,866,017 | B2 | 3/2005 | Ruggiero et al. | |
| 7,984,705 | B2 * | 7/2011 | Yang | F01L 13/065 123/90.22 |
| 8,210,144 | B2 | 7/2012 | Langewisch | |
| 8,831,861 | B2 | 9/2014 | Rammer et al. | |
| 9,624,850 | B2 | 4/2017 | Ulrey et al. | |
| 10,724,455 | B2 | 7/2020 | Hirschmann et al. | |
| 10,731,526 | B2 | 8/2020 | Lahr | |
| 10,753,289 | B2 | 8/2020 | Lilly et al. | |
| 2007/0256663 | A1 | 11/2007 | Huang et al. | |
| 2008/0041336 | A1 * | 2/2008 | Gibson | F02D 41/123 123/322 |

FOREIGN PATENT DOCUMENTS

| | | |
|---|---|---|
| JP | 2018145809 A | 9/2018 |

* cited by examiner

*Primary Examiner* — Logan M Kraft
*Assistant Examiner* — Johnny H Hoang
(74) *Attorney, Agent, or Firm* — Brannon Sowers & Cracraft PC

(57) ABSTRACT

Operating an engine includes opening and closing exhaust valves in an engine braking timing pattern, charging a first cylinder with air fed directly from an intake manifold, and releasing the directly fed air in a first braking event. Operating the engine further includes charging the first cylinder with air fed via a flow-through path through a second cylinder operating as an air conduit, and releasing the air fed through the flow-through path and pressurized to brake the engine in a second braking event. Related apparatus and valve lift profiles are also disclosed.

20 Claims, 4 Drawing Sheets

ENGINE BRAKING STRATEGY USING CYLINDER FLOW-THROUGH PATH FOR OPTIMIZING BRAKING POWER

TECHNICAL FIELD

The present disclosure relates generally to engine braking, and more particularly to an engine braking strategy where a cylinder is operated as a conduit between an intake manifold and an exhaust manifold to charge a neighboring cylinder with air for engine braking.

BACKGROUND

Compression-release braking or engine braking is employed in various systems to assist, supplement, and substitute for wheel brakes in slowing heavy machines such as off-highway trucks and various other heavy-duty vehicles. On-highway vehicles have also employed engine braking in various forms for many years. Engine braking generally functions to operate an engine as a power-consuming system utilizing reciprocation of the pistons to pressurize air, such that the engine applies a retarding force to the driveline components in the machine.

In a typical arrangement, an engine valve actuation system is configured to operate the engine valves in a normal or non-braking timing pattern, typically a four-stroke engine cycle, pressurizing air in the cylinders to be combusted with fuel for producing power and expelling exhaust. For engine braking, the valve actuation system is also configured to vary the valve opening and closing timings of at least the exhaust valves. Engine braking strategies can reduce wear and tear on the wheel brakes and/or assist the wheel brakes to hasten slowing of the machine. Certain systems operate in conjunction with a turbocharger having an internal geometry that can be adjusted to selectively reduce a flow area for exhaust or exhaust air from the engine to provide even further braking power. Valve actuation systems for engine braking and variable geometry turbochargers can add considerable expense to an engine system. Engineers are always searching for ways to economically increase and/or improve upon engine braking technologies to optimize brake power. U.S. Pat. No. 8,210,144 B2 to Langewisch proposes apparatus for engine braking according to one known design.

SUMMARY OF THE INVENTION

In one aspect, a method of engine braking includes opening both an intake valve and an exhaust valve for a first cylinder in an engine to establish a flow-through path from an intake manifold to an exhaust manifold, and opening an exhaust valve for a second cylinder in an engine a first time to charge the second cylinder with air fed through the flow-through path. The method further includes braking the engine via the second cylinder charged with the air fed through the flow-through path, and opening the exhaust valve for the second cylinder a second time to blow-down the second cylinder.

In another aspect, an engine system includes an engine having an engine housing with each of a first, a second, and a third cylinder formed therein, each of a first-, a second-, and a third-cylinder exhaust valve, and each of a first-, a second-, and a third-cylinder intake valve, an intake manifold, and an exhaust manifold. The engine system further includes a turbocharger having a compressor fluidly connected to the intake manifold and a turbine fluidly connected to the exhaust manifold, and a valve actuation system. The valve actuation system includes a camshaft a plurality of intake valve actuators, and a plurality of engine braking valve actuators each adjustable from a disengaged state, to an engine braking state operating the plurality of exhaust valves in an engine braking timing pattern. The engine braking timing pattern defines a primary cylinder-filling state, a secondary cylinder-filling state, and a cylinder-priming state. In the primary cylinder-filling state the first-cylinder intake valve is open to the intake manifold and the first-cylinder exhaust valve is closed. In the secondary cylinder-filling state, the first-cylinder intake valve is closed and the first-cylinder exhaust valve is open to the exhaust manifold. In the cylinder-priming state both of the first-cylinder exhaust valve and the first-cylinder intake valve are open and the second-cylinder exhaust valve is open establishing a flow-through path from the intake manifold to the exhaust manifold for priming the second cylinder with air.

In still another aspect, a method of operating an engine includes opening and closing a plurality of exhaust valves for a plurality of cylinders in an engine in an engine braking timing pattern. The method further includes charging a first cylinder of the plurality of cylinders with air fed directly from an intake manifold of the engine, and releasing the air fed directly from the intake manifold and pressurized in the first cylinder to brake the engine in a first braking event in an engine braking engine cycle. The method still further includes charging the first cylinder with air fed via a flow-through path through a second cylinder of the plurality of cylinders from the intake manifold to an exhaust manifold of the engine, and releasing the air fed through the flow-through path and pressurized in the first cylinder to brake the engine in a second braking event in the engine braking engine cycle.

DETAILED DESCRIPTION

Figure 1:
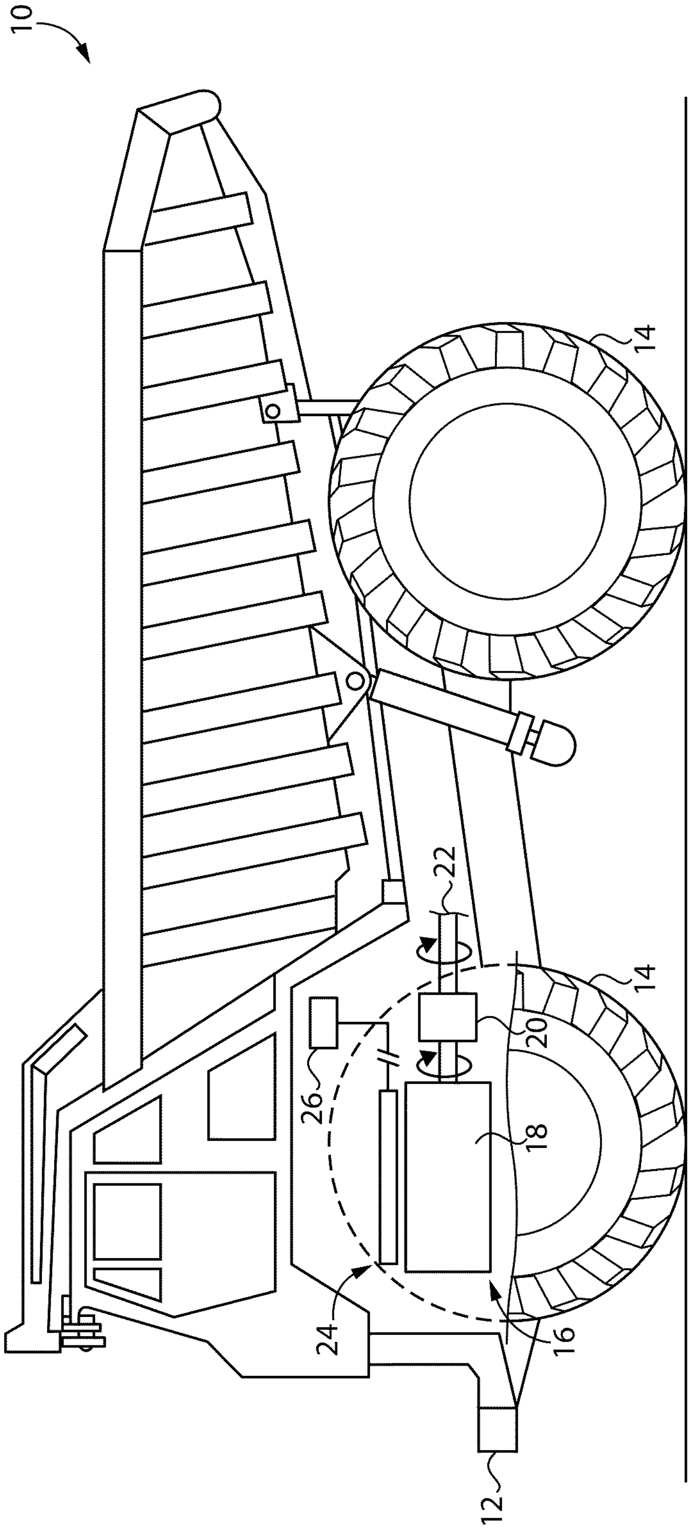
FIG. 1 is a diagrammatic view of a machine, according to one embodiment.

Referring to FIG. 1, there is shown a machine 10 according to one embodiment, and including a frame 12 supported on ground-engaging wheels 14. Machine 10 is shown in the context of an off-highway mining truck, however, any mobile machine could be configured and operated according to the present disclosure. Examples include track-type machines such as tractors, scrapers, motor graders, articulated trucks, and others including on-highway vehicles. Machine 10 also includes an engine system 16 having an engine 18 coupled to a transmission 20 operable to rotate a driveshaft 22 coupled to ground-engaging wheels 14. Engine system 16 also includes a valve actuation system 24 structured to operate engine valves including intake valves and exhaust valves in a normal or non-braking valve timing pattern, and an engine braking valve timing pattern as further discussed herein.

Figure 2:
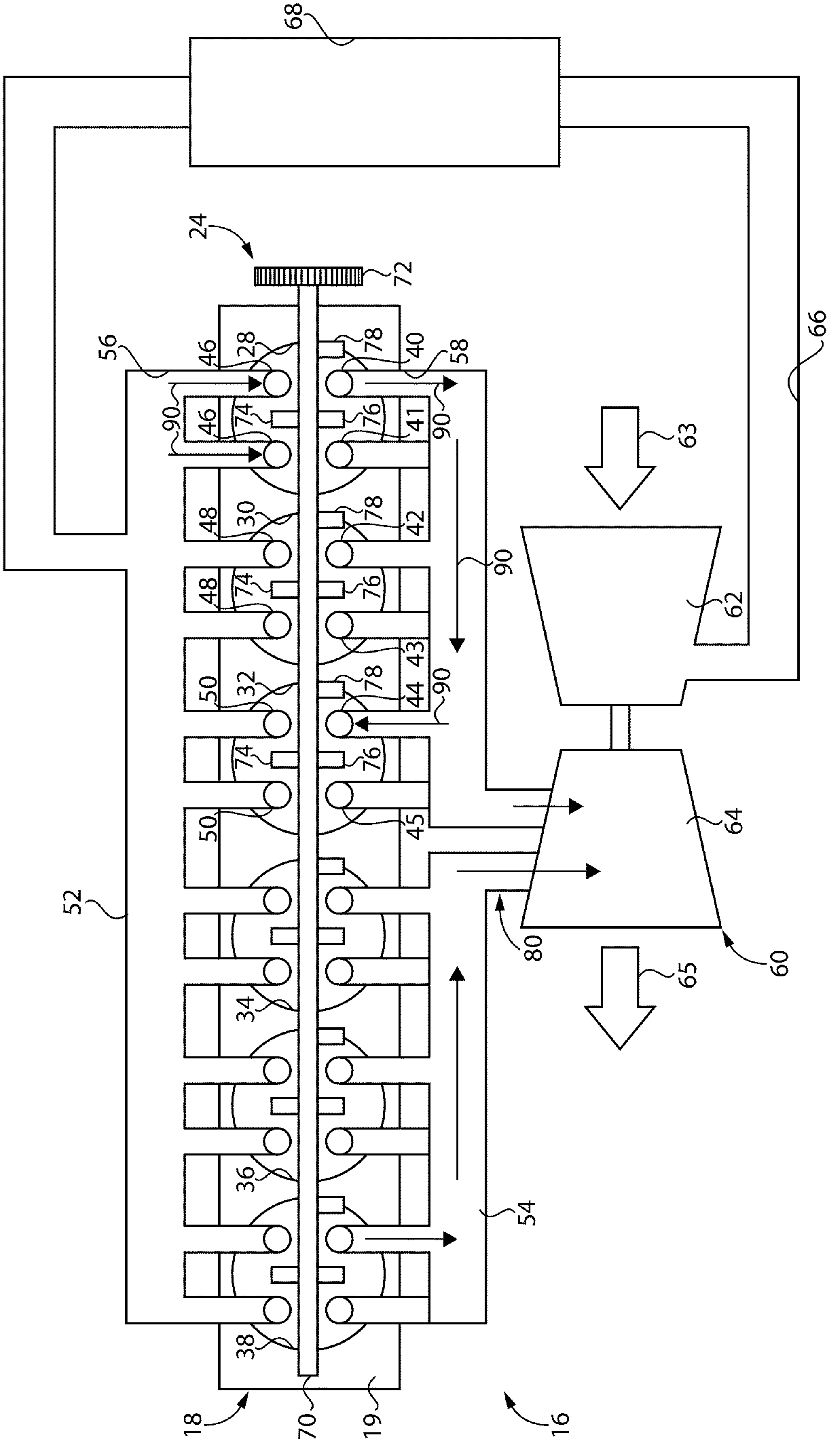
FIG. 2 is a diagrammatic view of an engine system, according to one embodiment.

Referring also now to FIG. 2, there are shown features of engine system 16 in further detail. Engine 18 includes an internal combustion engine, and in a practical implementation strategy includes a direct-injected compression-ignition diesel engine. The present disclosure is not thereby limited, however, and spark-ignited engines as well as engines operating on a range of fuel types including gaseous fuels and dual fuels are within the scope of the present disclosure. Engine system 16 may also include a control system 26 having suitable electronic computer controls for selectively transitioning valve actuation system 24 between the non-braking timing pattern and the engine braking timing pattern. The present disclosure is not limited with regard to conditions suitable for engine braking, but those skilled in the art will be familiar with typical applications including decelerating a machine traveling on a level grade or a downhill slope or limiting acceleration of a machine traveling on a downhill slope, for example.

Engine housing 19 may include any number of cylinders, in any suitable arrangement. In the illustrated embodiment engine housing has a total of six cylinders formed therein and arranged in an in-line pattern. The plurality of cylinders includes each of a first cylinder 28 (cylinder 1), a second cylinder 30 (cylinder 2), and a third cylinder 32 (cylinder 3). The other three cylinders are numbered 34, 36, and 38. It will be appreciated that description and discussion herein of three of the plurality of cylinders can be understood to refer by way of analogy to all cylinders except where otherwise indicated or apparent from the context. Moreover, the terms “first,” “second,” “third,” and other numerical descriptors are used herein for descriptive convenience and do not necessarily require or imply any particular ordering of functions, spatial arrangement, or other limitation.

Engine 18 further includes two exhaust valves and two intake valves associated with each respective cylinder. Two first-cylinder intake valves are shown via numeral 46, two second-cylinder intake valves via numeral 48, and two third-cylinder intake valves via numeral 50, and associated, respectively, with first cylinder 28, second cylinder 30, and third cylinder 32. Cylinders 34, 36, 38, will be analogously understood to be associated each with two intake valves.

Engine 18 also includes each of a first-cylinder exhaust valve 40, a second-cylinder exhaust valve 42, and a third-cylinder exhaust valve 44. Each of exhaust valves 40, 42, and 44 can be operated for engine braking as further discussed herein. Another first-cylinder exhaust valve 41, another second-cylinder exhaust valve 43, and another third-cylinder exhaust valve 45 are also provided. During engine braking exhaust valves 41, 43, and 45 may remain closed, however, embodiments where both exhaust valves associated with a given cylinder are used in engine braking are within the scope of the present disclosure. Cylinders 34, 36, and 38 may further be understood to each be associated with one exhaust valve that is used for engine braking and one exhaust valve that remains closed during engine braking in some embodiments.

Engine 18 also includes a turbocharger 60 having a compressor 62 receiving a feed of intake air 63 and fluidly connected to intake manifold 52. Turbocharger 60 also includes a turbine 64 outputting a feed of engine exhaust or air 65 from engine braking, with turbine 64 fluidly connected to exhaust manifold 54. An intake conduit 66 extends between compressor 62 and intake manifold 52 and feeds pressurized intake air through an aftercooler 68 in the illustrated embodiment. Exhaust manifold 54 may be separated into a first part (upon the right side in FIG. 2) receiving exhaust from cylinders 28, 30, 32, and a second part (upon the left side in FIG. 2) receiving exhaust from cylinders 34, 36, 38. The separate feeds of exhaust are conveyed to a divided turbine inlet 80. For purposes of the present description the terms “exhaust” and “air” are used, at times, interchangeably, to refer to fluids outputted from the respective cylinders to exhaust manifold 54. Turbine 64 may include a fixed geometry turbine. The significance of a divided turbine inlet 80 and a fixed geometry turbine in connection with engine braking will be further apparent from the following description.

FIG. 2 also illustrates further features of valve actuation system 24. Valve actuation system 24 includes a camshaft 70 having a cam gear 72 rotated typically by way of a geartrain of engine 18 in a generally conventional manner, at one-half engine speed. Camshaft 70 includes cam lobes (not shown) that rotate to actuate the various engine valves according to lift profiles of the respective cam lobes. Valve actuation system 24 also includes a plurality of intake valve actuators 74 operating to open and close the respective intake valves at appropriate timings in both the non-braking mode and the engine braking mode. Valve actuation system 24 also includes a plurality of exhaust valve actuators 76 operating to open and close the respective exhaust valves at appropriate timings in a non-braking mode. Valve actuation system 24 also includes a plurality of engine braking valve actuators 78. Intake valve actuators 74, exhaust valve actuators 76, and engine braking valve actuators 78 may include rocker arms reciprocating in response to rotation of associated cam lobes as will be familiar to those skilled in the art. Control system 26 may be operatable to selectively disengage exhaust valve actuators 76 and selectively engage engine braking valve actuators 78 when engine braking is desired. Any suitable known hydraulic, pneumatic, electrical, or mechanical control can be used to transition the operation of exhaust valves in engine 18 between the non-braking mode and the engine braking mode. In one practical implementation strategy all of the rocker arms will reciprocate in response to rotation of camshaft 70 in both a non-braking mode and an engine braking mode, although the present disclosure is not thereby limited.

Thus, engine braking valve actuators 78 may each be adjustable from a disengaged state, to an engine braking state operating at least some of the exhaust valves of engine 18, including in a practical implementation exhaust valves 40, 42, and 44, in an engine braking timing pattern. The engine braking timing pattern may define, for each respective cylinder, a plurality of different states defined by profiles of the cam lobes for the associated intake valves and exhaust valves. Put differently, if engine 18 were stopped during engine braking there are at least three different physical arrangements defined by valve positions of the intake valves and exhaust valves associated with each respective cylinder, as further discussed herein.

In an embodiment, the engine braking timing pattern defines, for each cylinder, a primary cylinder-filling state, a secondary cylinder-filling state, and a cylinder-priming state. With reference to cylinder 28 (cylinder 1), in the primary cylinder-filling state, first-cylinder intake valve 46 is open to intake manifold 52 and first-cylinder exhaust valve 40 is closed. This arrangement corresponds to filling cylinder 28 with air directly from intake manifold 52 for a primary braking event.

In the secondary cylinder-filling state of cylinder 28, first cylinder intake valve 46 is closed and first-cylinder exhaust valve 40 is open to exhaust manifold 54. In the secondary cylinder-filling state cylinder 28 is open to exhaust manifold 54 to be charged with air through exhaust manifold 54 as further discussed herein.

In the cylinder-priming state both of first cylinder exhaust valve 40 and first-cylinder intake valve 46 are open establishing a flow-through path from intake manifold 52 to exhaust manifold 54 for priming a neighboring cylinder, such as cylinder 30 (cylinder 2) or cylinder 32 (cylinder 3) with air. When cylinder 28 is in the cylinder-priming state a neighboring cylinder to be primed will have its respective exhaust valve open. Also in the cylinder-priming state of any of the respective cylinders it will be understood that the cylinder acts as an air conduit to feed pressurized air through engine housing 19 from intake manifold 52 to exhaust manifold 54. It will also be appreciated that the primary cylinder-filling state, the secondary cylinder-filling state, and the cylinder-priming state may be assumed by each cylinder of engine 18 at a plurality of timings in an engine braking engine cycle. In some instances, at any given timing more than one of the six cylinders might be in the primary cylinder-filling state, the secondary cylinder-filling state, or the cylinder-priming state.

As suggested above, in the secondary cylinder-filling state a second-cylinder exhaust valve may be open to fill a first cylinder with air from blowing-down the second cylinder. By way of example, in FIG. 2, if cylinder 28 is in the secondary cylinder-filling state, one of cylinder 30 or cylinder 32 may be blowing-down through its open exhaust valve. For any given cylinder, the primary cylinder-filling state may occur at an earlier crank angle timing, the secondary cylinder-filling state may occur at a later crank angle timing, and the cylinder-priming state may occur at a medium crank angle timing, in an engine braking engine cycle, although the present disclosure is not thereby limited.

It will thus be appreciated that for each engine braking engine cycle, the engine braking timing pattern may define among cylinders 28, 30, 32, a total of three primary cylinder-filling states, three secondary cylinder-filling states, and three cylinder-priming states. Again, as noted above analogous states are defined with respect to cylinders 34, 36, 38. Each of the three states includes a different combination of valve lift positions of each of first-cylinder exhaust valve 40, second-cylinder exhaust valve 42, third-cylinder exhaust valve 44, first-cylinder intake valve 46, second-cylinder intake valve 48, and third-cylinder intake valve 50. In FIG. 2, arrows 90 illustrate the flow-through path from intake manifold 52 to exhaust manifold 54 through cylinder 28. Thus, cylinder 28 can be understood to be in the cylinder-priming state acting as an air conduit.

Figure 3:
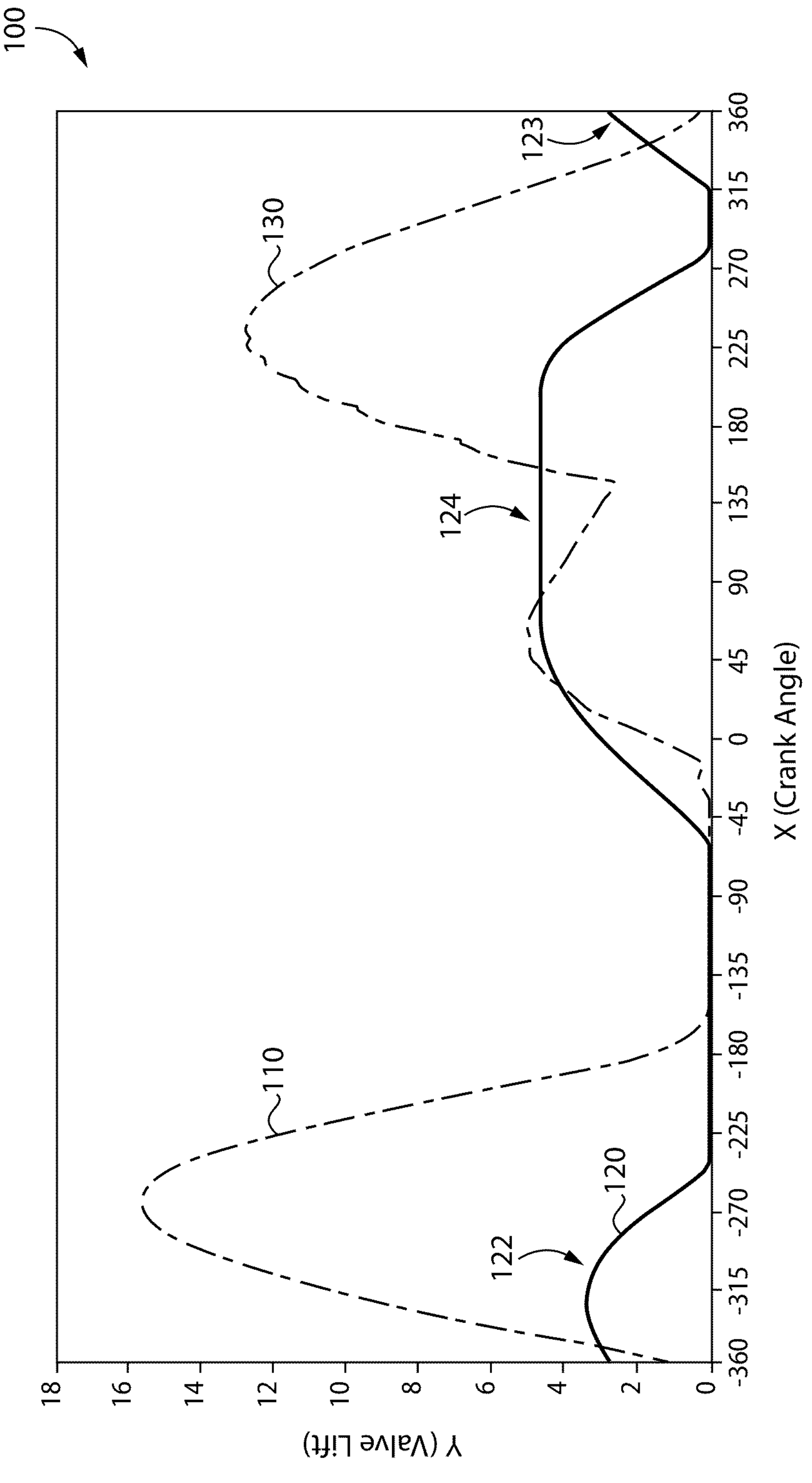
FIG. 3 is a graph of valve lifts in an engine braking engine cycle, according to one embodiment and compared to a conventional strategy.

Referring now to FIG. 3, there is shown a graph 100 illustrating valve lift profiles. In graph 100 numeral 110 shows an intake valve lift profile for one cylinder, and numeral 120 shows an exhaust valve lift profile for that one cylinder. Lift profile 120 also shows a bump or opening lift at 124, succeeding an opening lift at 122 and preceding another opening lift at 123. It can be noted lift 122 overlaps with lift 110 corresponding to filling the cylinder for a primary braking event occurring after lift 122 when the exhaust valve closes. Lift 124 is longer in duration and occurs during the same engine braking engine cycle as lift 122. Lift 124 opens the exhaust valve for priming the cylinder with air from the flow-through path through another cylinder and for subsequently filling from the blow-down of another cylinder. When lift 124 ends, a secondary braking event can occur. Lift 123 will typically overlap with another intake valve opening event and fills the cylinder again for another primary braking event, following an earlier primary braking event between lift 122 and lift 124. In a practical implementation, a primary braking event can include a larger mass flow braking event, and a secondary braking event can include a smaller mass flow braking event. A timing of a blow-down of one cylinder can be established so as to further charge a cylinder already primed via air supplied via the exhaust manifold. Also show in FIG. 3 is a lift profile 130 representing a non-engine braking strategy where a single braking event per cam revolution is performed. According to the present disclosure two braking events including the first or primary braking event and the second or secondary braking event occur per each full revolution of camshaft 70. It will further be appreciated that the combination of a primary braking event where a cylinder is filled directly through an intake valve from intake manifold 52 coupled with a secondary braking event where the cylinder is filled from a blow-down event in a neighboring cylinder and also by way of another cylinder acting as an air conduit improves overall braking power. Moreover, the improved braking power can be realized in a system employing a fixed geometry turbine, reducing costs.

Figure 4:
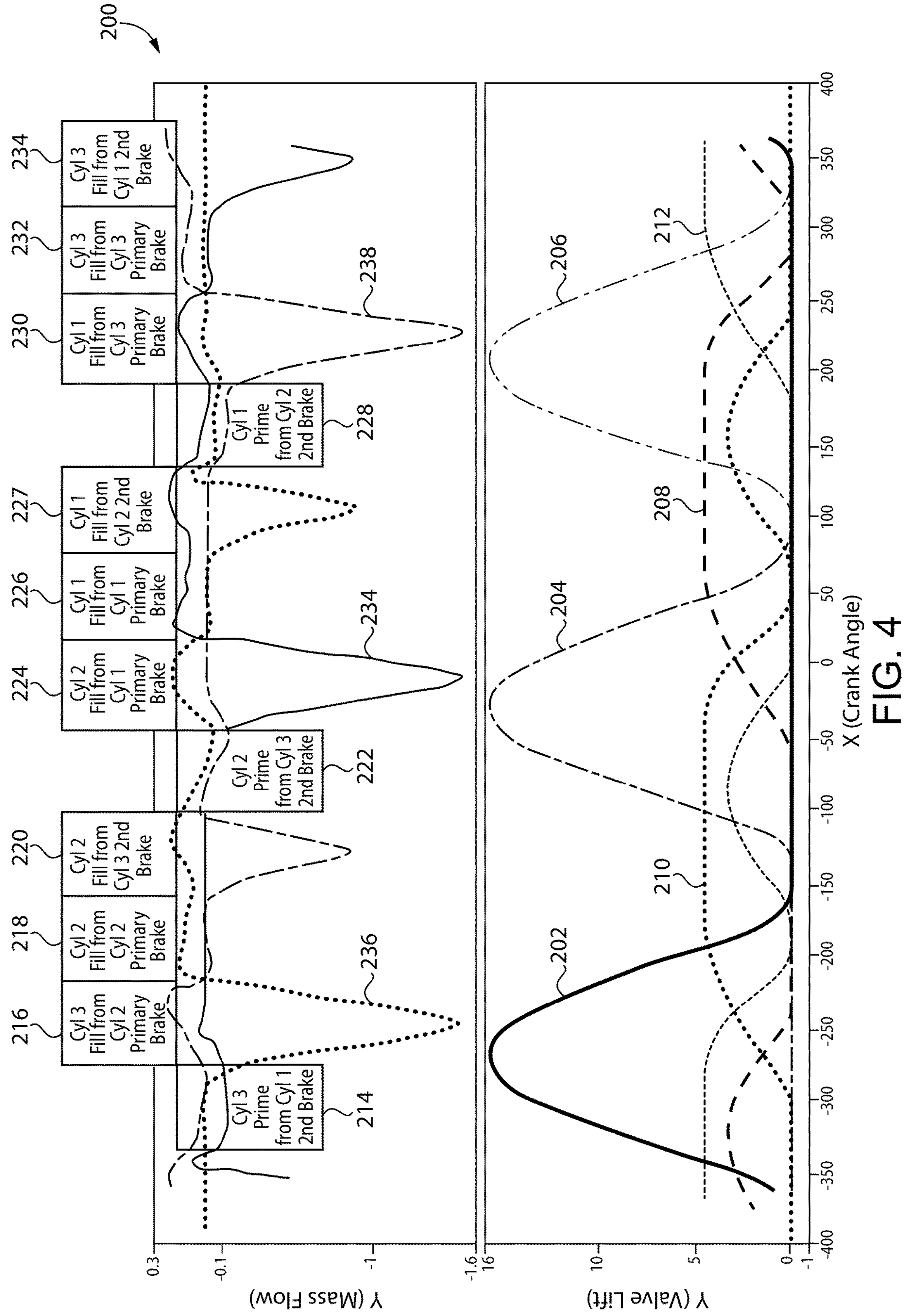
FIG. 4 is a graph of valve lifts and cylinder states in an engine braking timing pattern, according to one embodiment.

Referring now to FIG. 4, there is shown another graph 200 illustrating a plurality of valve lift profiles in the lower part of the graph, in conjunction with mass flow through exhaust ports in the upper part of graph 200, in an engine braking engine cycle. In graph 200, numeral 202 shows a first cylinder intake valve lift, 204 shows a second cylinder intake valve lift, and 206 shows a third cylinder intake valve lift. Numeral 208 shows a first exhaust valve lift, numeral 210 shows a second exhaust valve lift, and numeral 212 shows a third exhaust valve lift. Lift profiles 202, 204, 206 can be understood to reflect intake valve lifts at cylinder 28, cylinder 30, and cylinder 32, respectively. Exhaust valve lifts 208, 210, 212 can be understood to reflect exhaust valve lifts for cylinder 28, cylinder 30, and cylinder 32, respectively.

Graph 200 also illustrates various zones or states similar to the states discussed above and in comparison to the valve lifts. At 214, cylinder 3 is priming from cylinder 1 second brake, and intake manifold to exhaust manifold pass-through. It can be seen from lift profile 212 that the exhaust valve for cylinder 3 is open. At 216 cylinder 3 is filled from the cylinder 2 primary brake. At 216 it can be noted that lift 212 and lift 210 indicate both the corresponding exhaust valves are open. At 218 cylinder 2 is filling from the cylinder 2 primary brake. This means the exhaust valve for cylinder 2 is open and exhaust manifold 54 may feed some air into cylinder 2. At 220 cylinder 2 is filling from the cylinder 3 second brake. It can be seen that at 220 the cylinder 3 exhaust valve is open. At 222 cylinder 2 is now priming.

Numerals 224, 226, 227, and 228 correspond analogously to numerals 216, 218, 220, and 222 such that sequentially cylinder 2 is filling from cylinder 1 primary brake at 224, cylinder 1 is filling from cylinder 1 primary brake at 226, cylinder 1 is filling from cylinder 2 second brake at 227, and cylinder 1 is priming at 228. At numeral 230 cylinder 1 is filling from cylinder 3 primary brake, at 232 cylinder 3 is filling from cylinder 3 primary brake, and at 234 cylinder 3 is filling from cylinder 1 second brake. Numeral 234 shows an exhaust port mass flow for cylinder 1, numeral 236 shows an exhaust port mass flow for cylinder 2, and numeral 238 shows an exhaust port mass flow for cylinder 3.

INDUSTRIAL APPLICABILITY

Referring to the drawings generally, braking engine 18 can include opening both an intake valve and an exhaust valve for a first cylinder in an engine to establish a flow-through path from an intake manifold to an exhaust manifold as discussed herein. An exhaust valve for a second cylinder can be opened a first time to charge or prime the second cylinder with air fed through the flow-through path. The second cylinder charged with air fed through the flow-through path may be used to brake the engine, and then the exhaust valve for the second cylinder opened a second time to blow-down the second cylinder. As discussed herein, a blow-down of one cylinder in the engine may be timed so as to further charge an already primed other cylinder via air supplied through the exhaust manifold.

So long as engine braking is desired, engine system 10 can be operated according to this general strategy, applied to each cylinder in the engine, of priming a cylinder with air fed via a flow-through path, further charging the primed cylinder based on a blow-down of another cylinder, braking the engine in a secondary braking event, charging the cylinder with air fed directly from an intake manifold, and then braking the engine in a primary event. When engine braking is no longer desired, valve actuation system 24 can be adjusted to return to a non-braking valve timing pattern. The present disclosure can be applied to new engines as original equipment, or potentially by installation of valve-train 24 on an engine already in service as an aftermarket product.

The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure. Other aspects, features and advantages will be apparent upon an examination of the attached drawings and appended claims. As used herein, the articles "a" and "an" are intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method of engine braking comprising:

opening both an intake valve and an exhaust valve for a first cylinder in an engine to establish a flow-through path from an intake manifold to an exhaust manifold;

opening an exhaust valve for a second cylinder in the engine a first time to charge the second cylinder with air fed through the flow-through path;

braking the engine via the second cylinder charged with the air fed through the flow-through path; and opening the exhaust valve for the second cylinder a second time to blow-down the second cylinder.

2. The method of claim 1 wherein the braking the engine includes braking the engine via the second cylinder in a secondary braking event, and further comprising braking the engine via the second cylinder in a primary braking event preceding the secondary braking event.

3. The method of claim 2 further comprising priming the second cylinder via the opening the exhaust valve for the second cylinder a first time.

4. The method of claim 3 further comprising timing a blow-down of another cylinder in the engine so as to further charge the primed second cylinder via air supplied via the exhaust manifold.

5. The method of claim 4 wherein the primary braking event and the secondary braking event occur in the same engine braking engine cycle.

6. The method of claim 5 further comprising charging the second cylinder with pressurized air fed directly from the intake manifold, and braking the engine via the primary braking event based on the charging the second cylinder with pressurized air.

7. The method of claim 6 wherein the secondary braking event includes a smaller mass flow braking event and the primary braking event includes a larger mass flow braking event.

8. The method of claim 7 further comprising braking the engine a total of two times via each one of a plurality of cylinders per each revolution of a camshaft of the engine.

9. The method of claim 1 further comprising feeding pressurized air from the exhaust manifold to a divided turbine inlet to a turbine in a turbocharger.

10. The method of claim 9 wherein the turbocharger includes a fixed geometry turbocharger.

11. An engine system comprising:

an engine including an engine housing having each of a first, a second, and a third cylinder formed therein, each of a first-, a second-, and a third-cylinder exhaust valve, and each of a first-, a second-, and a third-cylinder intake valve, an intake manifold, and an exhaust manifold;

a turbocharger including a compressor fluidly connected to the intake manifold and a turbine fluidly connected to the exhaust manifold;

a valve actuation system coupled to the camshaft and including a plurality of intake valve actuators, and a plurality of engine braking valve actuators adjustable from a disengaged state, to an engine braking state operating the plurality of exhaust valves in an engine braking timing pattern;

the engine braking timing pattern defining a primary cylinder-filling state, a secondary cylinder-filling state, and a cylinder-priming state; and in the primary cylinder-filling state the first-cylinder intake valve is open to the intake manifold and the first-cylinder exhaust valve is closed, in the secondary cylinder-filling state the first-cylinder intake valve is closed and the first-cylinder exhaust valve is open to the exhaust manifold, and in the cylinder-priming state both of the first-cylinder exhaust valve and the first-cylinder intake valve are open and the second-cylinder exhaust valve is open establishing a flow-through passage from the intake manifold to the exhaust manifold for priming the second cylinder with air.

12. The engine system of claim 11 wherein, in the secondary cylinder-filling state the second-cylinder exhaust valve is open to fill the first cylinder with air from blowing-down the second cylinder.

13. The engine system of claim 12 wherein the primary cylinder-filling state occurs at an earlier crank angle timing, the secondary cylinder-filling state occurs at a later crank angle timing, and the cylinder-priming state occurs at a medium crank angle timing, in an engine braking engine cycle.

14. The engine system of claim 11 wherein the engine braking timing pattern defines a total of three primary cylinder-filling states, three secondary cylinder-filling states, and three cylinder-priming states in an engine braking engine cycle and each including a different combination of valve lift positions of each of the first-, second-, and third-cylinder exhaust valves, and each of the first-, second-, and third-cylinder intake valves.

15. The engine system of claim 11 wherein the turbocharger includes a divided turbine inlet.

16. The engine system of claim 15 wherein the turbine includes a fixed geometry turbine.

17. A method of operating an engine comprising:

opening and closing a plurality of exhaust valves for a plurality of cylinders in an engine in an engine braking timing pattern;

charging a first cylinder of the plurality of cylinders with air fed directly from an intake manifold of the engine;

releasing the air fed directly from the intake manifold and pressurized in the first cylinder to brake the engine in a first braking event in an engine braking engine cycle;

charging the first cylinder with air fed via a flow-through path through a second cylinder of the plurality of cylinders from the intake manifold to an exhaust manifold of the engine; and releasing the air fed through the flow-through path and pressurized in the first cylinder to brake the engine in a second braking event in the engine braking engine cycle.

18. The method of claim 17 further comprising further charging the first cylinder for the second braking event with air fed to the exhaust manifold via blowing-down another of the plurality of cylinders.

19. The method of claim 17 further comprising feeding the released air through a divided turbine inlet of a turbocharger.

20. The method of claim 19 wherein the turbocharger includes a fixed geometry turbocharger.

* * * * *